United States Patent Office 2,854,078
Patented Sept. 30, 1958

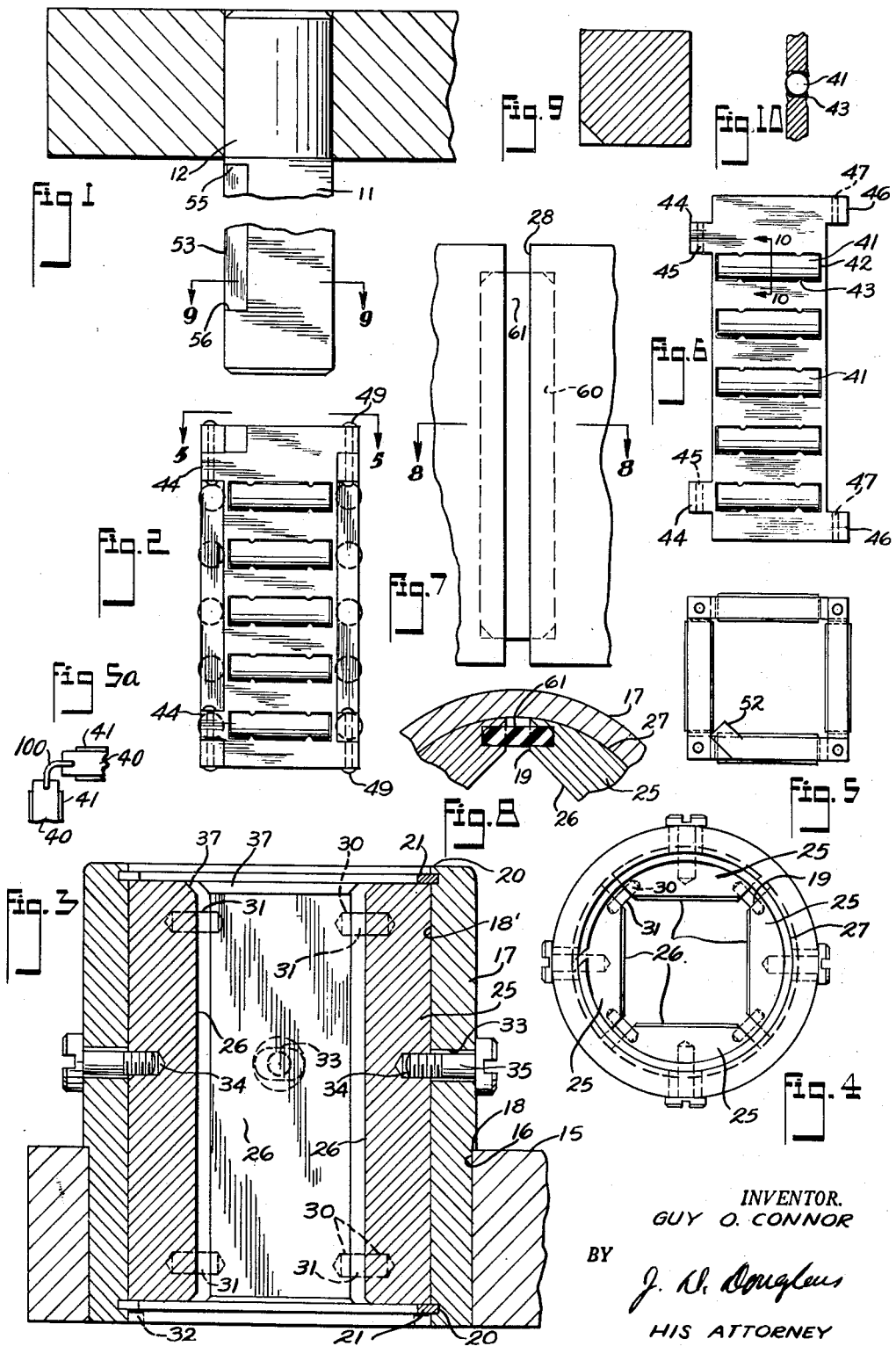

2,854,078

DIE SET

Guy O. Conner, Cleveland Heights, Ohio

Application April 20, 1955, Serial No. 502,551

11 Claims. (Cl. 164—118)

This invention relates to improvements in die sets and more particularly to improvements in guides for anti-friction die sets such as shown in my Patent No. 2,422,775.

As disclosed in the above patent a die set is provided having a square leader pin adapted to be guided by a square guide with interposed anti-friction means between the guide and the pin. In the construction of the above devices, it is difficult to provide a square hole in the guide, or a perfectly square pin, the surfaces of which are in the proper alignment with each other. In the patent I illustrated several forms of the invention which included providing dove-tailed inserts for the guide and in one instance the provision of segmental inserts each of which abutted each other to form a square hole. The principal reason for using inserts in the manner described was that by their use the manner of making the hole was simplified and the need for an extremely accurate broaching operation was eliminated.

In the case of the guide using the segmental inserts, some difficulty was still observed in that the edges of the inserts were in contact with each other making it necessary to provide the hole for receiving the inserts of a diameter so that it is substantially equal to the diameter of the assembled inserts. With the foregoing, the tolerances had to be accurately maintained otherwise considerable difficulty was realized in assembling the parts and there was considerable opportunity for the adjacent sides to be out of square relative to each other. Furthermore even should the hole be square if the bearing faces on the pins are out of square the bearings and faces are both subject to undesirable wear. Should both the pin and guide surfaces depart from squareness then the difficulty is even more greatly accentuated.

By the present invention I am able to make a leader pin guide which is considerably easier to assemble and which, when assembled, has a self-aligning feature, in connection with the leader pin, that materially increases the efficiency of the same.

My new guide is much easier to machine and easier to assemble after machining thus resulting in economies in manufacture which will be more apparent as the description proceeds.

In the drawings:

Fig. 1, is a view partly in section and partly in fragmentary elevation of a plate of a die set and a leader pin;

Fig. 2, is an elevational view of an anti-friction bearing assembly;

Fig. 3, is a vertical medial section of a leader pin guide;

Fig. 4, is a top plan view on a reduced scale of the leader pin guide;

Fig. 5, is a top plan view of the bearing assembly;

Fig. 5a, is a fragmentary plan view of a modification;

Fig. 6, is an elevational view of a single section of the bearing assembly;

Fig. 7, is a fragmentary elevation of a portion of the guide showing a modification;

Fig. 8, is a sectional view on the line 8—8 of Fig. 7;

Fig. 9, is a section on the line 9—9 of Fig. 1; and

Fig. 10, is a section on the line 10—10 of Fig. 6.

In the drawings, Figs. 1, 2 and 3 are shown in the positions they would take prior to assembly, except for the fact that, as will hereinafter more clearly appear, the bearing assembly of Fig. 2 would normally remain on the leader pin.

In Fig. 1 there is illustrated a portion of an upper die set plate in which a square leader pin 11 is inserted, the pin being provided with a cylindrical portion 12 disposed in a cylindrical hole in the die set and held therein by a pressed fit. The usual lower plate 15 is also provided having a circular opening 16 for receiving an outer cylindrical leader pin guide housing 17, the guide housing is provided with a shouldered portion 18 which is pressed against the top of the plate. The guide is retained in the plate by a pressed fit. It will be appreciated that the die set may have one or more of these pins and guides as is well known to those versed in the art.

The interior of the guide housing is provided with a bore 18' of cylindrical conformation the upper and lower ends of the bore being provided with grooves 20 for the reception of C rings 21.

The guiding surfaces, of which there are four for each guide, are each provided by an elongated member 25 having a flat bearing surface 26 and a curved outer surface 27, the curvature of the outer surface being complementary to that of the bore 18'. In cross section each member is substantially a segment of a circle except that the ends 19 of the segment are removed at an angle of 135° relative to the bearing surface. The amount of material removed is such that when the segments are in place a gap is provided between adjacent segments, the walls 19 of which are parallel to each other. Each of these walls is provided with seats 30, which may be blind holes, spaced closely from the top and bottom, and the seats in the adjacent segments being aligned with each other. Springs 31 are disposed in each pair of opposed seats and hold the parts outward away from each other under pressure. Thus the assembly of four guide segments and their springs can be made and the segments pressed into the housing causing a slight collapse of the springs which are sufficiently resilient to allow the segments to be inserted in the housing relatively easily. Preferably the lower C ring is disposed in place and the guide segments and their springs forced downwardly into the housing until they seat upon the lower C ring.

It will be appreciated that the lower C ring could be eliminated and a circumferential boss 32 shown in dotted lines, Fig. 3, provided on the end of the housing in place of the C ring to function as a seat for the segments. It will be appreciated that this boss may be a continuous circumferential member or can be lugs, as desired, the main desideratum being that means is supplied for preventing the segments from being pushed entirely through the housing, and to furnish a seat which acts as a thrust member during use.

After the segments are in the housing the upper C ring may be snapped into position to hold them securely therein. The housing walls at 90° inervals are provided with circumferentially elongated apertures 33. Each of the segments is provided with a threaded blind hole 34 disposed opposite to the apertures in the housing wall. Screws 35 are provided, one for each segment, the heads of which engage the outer surface of the housing and the threaded ends of which are threaded in the blind holes 34. Preferably the apertures are large enough to provide a slight vertical and lateral clearance for the screws which further assist in decreasing the necessity for maintaining extremely accurate tolerances. Although one screw is shown for each of the segments it will be appreciated that more than one may be used should it be found desirable, which may occur should an extremely long guide be used.

The upper and lower extremities of each of the segments are chamfered at 37 to provide a guide surface which allows easy insertion of the pin in the bearing.

The bearing assembly, in this case, comprises a housing which is of hollow square conformation and each side of which supports rollers therein. Preferably each side 40 is formed of a sheet of material of general rectangular formation having a thickness which is slightly smaller than the diameter of the bearings 41, which preferably are rollers. The sides are provided with rectangular apertures 42 slightly larger than the bearings and with their long direction extending horizontally. The bearings are held in these apertures by upsetting the material of the sides, as at 43, to deform the metal in such a manner that it provides projections spaced from the ends and from each other, the distance between opposite projections on opposite sides of the apertures being less than the diameter of the roller. The roller is securely held in place but is still free to roll.

The number of rollers carried by the retainer may be varied depending upon the length of the retainer.

As viewed in the figure the left side of the retainer is provided, spaced from its top, with a projection 44 and a similar one spaced from the bottom, which projections are provided with vertically extending holes 45. On the opposite side or to the right, as viewed in the figure, projections 46 are provided having similar holes 47. The top of the projection on the left and the bottom of the projection on the right align with each other across the retainer. Thus the retainer may be assembled with the holes in the projections in alignment and interlocked with each other by means of pins 49. Since each of the parts are the same, all of the sides of the bearing retainer may be made alike in any form selected and assembled to provide an assembly which comprises a square retainer with four sets of rollers disposed in four separate plates at 90° to each other. At this point it might be well to point out that, although for the purpose of simplification I have shown four guide segments, that it is within the purview of my invention to use three, or more than four, should it be desired.

Preferably one of the bearing plates should be upset to provide an inwardly extending boss 52 at one corner. This boss is slidable along a surface 53 that is formed on the pin by simply removing a corner of the pin to provide an elongated notch the extremities of which are defined by the upper and lower shoulders 55 and 56. It will be apparent that, with the hinged construction of the bearing retainer, the retainer with its bearing may be assembled around the pin with the lug 52 riding in the notch and preventing the retainer from falling off of the pin when the lug engages the lower edge 56 thereof.

Preferably the guides are assembled in the housing and the screws 35 inserted but not tightened. The guides then rest on the lower retainer ring or boss and the upper ring is snapped in position to hold them in place. The bearing and its retainer are assembled on the pin. The upper die set plate along with its pin and bearing are then placed above the lower die set plate with the pins and bearings in axial alignment with the guides after which the pin with its bearing is moved into telescoping engagement with the guides. It will be seen that should there be any deviation from squareness of the adjacent sides of the pin that the guide segments will automatically, under pressure of the bearings interposed in between the pin and the guide segments, align themselves accurately with the pins and bearings. Therefore the pressure between the pins and the bearings and the guides is solely that due to the pre-loading which has previously been determined. Due to the hinged construction of the retainer it also aligns itself automatically with the other parts. Once the pin and its bearing is inserted in the guide and the parts have aligned themselves relative to each other the locking screws 35 may be securely tightened to pull the segments firmly against the inner wall of the guide housing.

Thus it will be seen that the manufacturing tolerances are greatly decreased, that the sides of the pin may be out of square and that this is compensated for by the automatic alignment of the guide segments.

Although I have stated that the segments are provided with springs interconnecting them through their adjacent faces it will be appreciated that material other than springs may be used. For instanec, plugs of rubber seated in the recesses and extending between the adjacent segments in which rubber is displaceable will also function as springs would function. In addition as shown in the drawings at Fig. 7, the walls 19 may be provided with elongated grooves 60 of rectangular cross section and a strip of rubber 61 inserted in the opposite grooves and interconnecting adjacent segments to each other.

It is thus apparent that a considerable economy is realized due to the fact that the manufacturing tolerances are decreased and that the device may be easily assembled without special equipment and when assembled provides an efficient alignment of the parts with each other.

In the drawings the embodiments of the invention that have been illustrated are for the purpose of explanation of the invention rather than limitation. For instance although I have shown the lugs 44 and 46 on the bearing retainer as being pivotally connected by pins, in the interest of greater economy the lugs could be omitted and links 100 of resilient wire like metal substituted, these links extending between adjacent corners to permit the desired alignment of the bearing and guide with the guiding surfaces. It will be apparent that numerous and extensive departures may be made therefrom by those versed in the art without departing from the invention as defined in the scope of the appended claims.

I claim:

1. A die set construction comprising spaced apart plates, a polygonal pin carried by one plate, a pin guide housing carried by the other plate and pin guide segments disposed in the pin guide housing and movable about the axis of the pin for self-alignment with the sides of the pin when the pin is inserted in said housing.

2. A die set comprising spaced apart plates, a pin carried by one plate having flat planar sides, a guide housing carried by the other plate, pin guide segments disposed in the guide housing and having planar surfaces arranged to be disposed opposite to the planar surfaces of the pin, said segments being separated from each other and individually movable angularly about the axis of the pin for self-alignment of their planar surfaces with the opposite planar surfaces of the pin when the pin is inserted in said housing.

3. A device as claimed in claim 2 where the separated segments are provided with opposed faces having seats and resilient means are disposed in said seats and connecting the segments to each other.

4. A die set comprising spaced apart plates, a pin having flat planar surfaces carried by one plate, a pin guide carried by the other plate and comprising a housing, removable segments disposed in the housing and each having a flat planar surface for alignment in opposition to a corresponding planar surface on the pin, and means supporting the segments individually in the housing for limited movement angularly about the axis of the pin for self-alignment of the planar surfaces of the segments with the corresponding planar surfaces on the pin when the pin is inserted in the housing.

5. An apparatus as described in claim 4 where retainer means is provided at opposite ends of the housing for holding the segments against movement longitudinally of the housing.

6. A die set comprising spaced apart plates, a pin having flat planar surfaces thereon carried by one of the plates, a guide for the pin carried by the other plate and comprising housing, segments disposed in the housing and having flat planar surfaces for disposal opposite to the planar surfaces on the pin, said segments being movable angularly about the axis of the pin for self-alignment of their planar surfaces with the opposite planar surfaces on the pin when the pin is inserted in the housing, bearing means interposed between the pin and said segments and comprising a plurality of bearing members carrying bearings and having sides in which the bearings are disposed with the bearings interposed between the planar surfaces of the pin and guide, and pivotal means connecting each of said bearing members to the other.

7. A die set comprising spaced apart plates, a pin having flat planar surfaces thereon carried by one of the plates, a guide for the pin carried by the other plate and comprising a housing, separate segments disposed in the housing and having flat planar surfaces for disposal opposite to the planar surfaces on the pin in spaced relation thereto, means supporting the segments individually for limited movement angularly about the axis of the pin for self-alignment of said planar surfaces on the segments with the oppositely disposed planar surfaces on the pin when the pin is inserted in the housing, bearing means interposed between the pin and said segments and comprising a plurality of bearing members carrying bearings and having sides in which the bearings are disposed with the bearing interposed between the planar surfaces of the pin and guide, and resilient means connecting each of said bearing members to the other at the corners thereof.

8. A device as claimed in claim 7 where the edges of the segments are spaced apart and means is provided connecting adjacent edges of adjacent segments to each other and pressing said segments apart and into engagement with the housing wall.

9. A device as in claim 8 where the housing wall is provided with slots and screw means extends through the wall into threaded engagement with the segments.

10. A die set comprising spaced apart plates, a substantially square leader pin carried by one plate having flat planar bearing faces extending longitudinally thereof on opposite sides, a leader pin guide carried by the other plate and comprising a housing, guide bearing surface members for said housing each comprising an elongated member having a curved outer surface arranged for seating engagement with a curved inner surface on the housing, said members each being provided with a threaded opening and screw means extending through elongated apertures in the housing into said member for drawing the member securely against said curved inner surface on the housing, retainer means at each end of the housing for providing end thrust means for said guide bearing members, said guide bearing members being spaced apart at their adjacent edges and pressure exerting means seated in said edges and connecting the adjacent members to each other, said guide bearing members being provided with flat planar surfaces disposed in spaced relation to the bearing surfaces on said leader pin and bearing means interposed between the bearing surfaces on the leader pin and said planar surfaces on said guide bearing members.

11. A device as described in claim 10 where the bearing means includes a cage formed of rectangular plates which support bearings and the corners of said rectangular plates are pivotally connected together.

References Cited in the file of this patent

UNITED STATES PATENTS

| | | |
|---|---|---|
| 1,138,860 | Gladwin | May 11, 1915 |
| 2,422,775 | Conner | June 24, 1947 |
| 2,627,313 | Marsilius | Feb. 3, 1953 |